(12) United States Patent
Zantos

(10) Patent No.: US 12,631,204 B2
(45) Date of Patent: May 19, 2026

(54) COLINEAR COUPLING ASSEMBLY

(71) Applicant: Westcoast Performance USA Inc.,
Anaheim, CA (US)

(72) Inventor: Robert Zantos, Santa Ana, CA (US)

(73) Assignee: Westcoast Performance USA Inc.,
Anaheim, CA (US)

( * ) Notice: Subject to any disclaimer, the term of this
patent is extended or adjusted under 35
U.S.C. 154(b) by 471 days.

(21) Appl. No.: 18/316,593

(22) Filed: May 12, 2023

(65) Prior Publication Data

US 2023/0392629 A1     Dec. 7, 2023

Related U.S. Application Data

(60) Provisional application No. 63/349,462, filed on Jun.
6, 2022.

(51) Int. Cl.
*F16B 7/04*     (2006.01)
(52) U.S. Cl.
CPC .................................. *F16B 7/0406* (2013.01)
(58) Field of Classification Search
CPC ........ F16B 7/0406; F16B 7/10; F16B 7/0413;
F16B 7/025; F16B 7/182; F16B 7/18;
(Continued)

(56) References Cited

U.S. PATENT DOCUMENTS 2,818,291 A * 12/1957 Corns ...................... B25G 1/04
403/102
3,819,198 A * 6/1974 Groves .................... A63C 5/02
403/339

(Continued)

OTHER PUBLICATIONS

UTVDistribution Tube Connector Adapter, Jul. 9, 2019, Amazon,
site visited May 21, 2025: https://www.amazon.com/Tube-Connector-
Adapter-Fabrication-Bungs/dp/B07W81X932/ (Year: 2019).*

(Continued)

*Primary Examiner* — Amber R Anderson

(57)     ABSTRACT

The disclosure concerns a coupling assembly comprising at
least first coupler, a second coupler, locators which assist in
properly aligning the couplers, and hardware to hold the two
couplers together. The coupling assembly may have more
than one coupler. One end of each coupler is configured to
attach to an assembly member. Another end of each coupler
is configured with a coupling mechanism such that it may be
coupled to the coupling mechanism of another coupler.

The interior side of each coupling mechanism may have one
or more recesses called locator pockets. The locator pockets
on one coupler are configured to line up with the locator
pockets on another coupler. As the first and second couplers
are brought into an aligned position, a locator may be placed
into the void created by each aligned locator pocket pair.
After the locators are inserted and the couplers are brought
into approximate alignment, the user may insert bolts
through the couplers and apply nuts to the bolts.

The user may then tighten the nuts onto the bolts which will
pull the interior sides of the two couplers towards each other.
As the interior sides are pulled towards each other the
locator pockets begin to apply a compressive force to the
locators. This compressive force seats the locators into their
respective locator pockets, causing the couplers to self-align,
often colinearly, with each other. When the hardware has
been firmly tightened, the locators will have accurately and
precisely aligned the couplers with each other and helped to
constrain the couplers longitudinally, vertically, and hori-
zontally with respect to each other.

17 Claims, 8 Drawing Sheets

(58) Field of Classification Search
CPC ........ F16B 7/00; F16B 7/042; Y10T 403/655;
Y10T 406/65; Y10T 403/7152; B62K
19/06; B62K 19/18; B62D 27/06
See application file for complete search history.

(56) References Cited

U.S. PATENT DOCUMENTS

| | | | | |
|---|---|---|---|---|
| 4,070,120 | A * | 1/1978 | Bald | F16B 5/02 702/150 |
| 4,717,180 | A * | 1/1988 | Roman | B60S 3/047 285/185 |
| 5,275,444 | A * | 1/1994 | Wythoff | F16L 27/0849 285/272 |
| 6,776,179 | B1 * | 8/2004 | Chen | E04H 15/48 135/147 |
| 2002/0176736 | A1 * | 11/2002 | Tsou | F16C 11/103 403/103 |
| 2012/0063839 | A1 * | 3/2012 | Mo | F16B 7/182 403/84 |
| 2019/0269069 | A1 * | 9/2019 | Boyles | A01D 34/416 |
| 2020/0232493 | A1 * | 7/2020 | Park | F16B 2/04 |
| 2021/0323613 | A1 * | 10/2021 | Yuan | B62D 27/065 |
| 2022/0034113 | A1 * | 2/2022 | Huang | F16B 7/0406 |
| 2022/0048590 | A1 * | 2/2022 | Middel | F16B 7/0406 |
| 2023/0037811 | A1 * | 2/2023 | Warshaw | E04F 11/1808 |

OTHER PUBLICATIONS amazon.com, UTVDistribution; Interlocking Chromoly Bungs Tube Connectors Roll Cage 1-3/4" x(.095 Wall); https://www.amazon.com/Interlocking-Chromoly-Bungs-Connectors-x-095/dp/B078X252FD/.
ebay.com, Nixface; 1-3/4" Weld In Tube Connectors Roll Cage Bungs for .095 & .120 Wall—1 Pack; https://www.ebay.com/itm/196279314266?chn=ps&norover=1&mkscid=101&itemid=196279314266&targetid=2209868825741&device=c&mktype=pla&googleloc=9031597&poi=&campaignid=20587267821&mkgroupid=153600247106&rlsatarget=pla-2209868825741&abcld=9323055&merchantid=5305482563&geoid=9031597&gad_source=1.
amazon.com, UTVDistribution; Heavy Duty Universal Tube Connector Fabrication Bungs 1 3/4"x .095 & . 120 wall Tube; https://www.amazon.com/Heavy-Universal-Connector-Fabrication-Bungs/dp/B07FPSQ4M2/ref=asc_df_B07FPSQ4M2/.
tmrcustoms.com; Notch Ready Interlocking ID Tube Clamp—Round https://www.tmrcustoms.com/products/notch-ready-interlocking-id-tube-clamp-round.

* cited by examiner

COLINEAR COUPLING ASSEMBLY

CROSS-REFERENCE TO RELATED APPLICATIONS

This application claims benefit of priority with U.S. Provisional Application Ser. No. 63/349,462, filed Jun. 6, 2022; the entire contents of which are hereby incorporated by reference.

BACKGROUND

Field of the Invention

This invention relates to coupling assemblies; more particularly, coupling assemblies which precisely align and couple assembly members which may be tubular assembly members.

Description of the Related Art

When fabricating structural assemblies, it is sometimes necessary for the assembly to be disassembled or capable of disassembly. When assembling a structure from various assembly members, it can be difficult to precisely and accurately (e.g. colinearly, perpendicularly, etc.) align assembly members. This problem is specifically present when assembling tubular members which will be attached or coupled together. Conventional tubing couplers (e.g. existing vehicle roll cage tube connectors) may couple tubular members by utilizing a conventional handshake geometry.

These conventional couplers may be moderately effective at constraining the assembly members longitudinally, along the axis of the coupler. Conventional couplers may be reasonably effective at constraining the assembly members vertically, in the direction parallel to the applied fasteners and perpendicular to the contact plane of the couplers. However, conventional couplers may not be sufficiently effective at constraining the assembly members horizontally, in the plane of the couplers and perpendicular to the axis of the coupler.

If coupled assembly members are not precisely and accurately aligned and firmly held in place horizontally, vertically, and longitudinally, the strength and fitment of the tubular assembly or structure may be negatively affected. There is a need in the coupling assembly field for a coupling assembly which provides longitudinal, vertical, and horizontal alignment with consistency and strength. Embodiments of the disclosed invention fill this need.

SUMMARY

The disclosure concerns a coupling assembly comprising a first coupler, a second coupler, locators which assist in properly aligning the couplers, and hardware to hold the two couplers together. A coupling assembly involving more than two couplers utilizing the same alignment technology is considered within the scope of this invention as would be understandable to one skilled in the art. What is considered "proper alignment" of the couplers may vary depending on the embodiment, however in some embodiments "proper alignment" refers to colinear alignment of the central axes of the couplers.

The first coupler may have a first end and a second end. The first end is capable of being attached or coupled to a given assembly member. In the case of tubular assembly members, the first end of the first coupler may form a cylindrical shape which may be inserted into the tubular assembly member.

Similarly, the second coupler may have a first end and a second end, and the first end of the second coupler may be capable of being attached or coupled to a given assembly member. The second end of the first coupler and the second end of the second coupler are capable of being coupled together such that they are constrained longitudinally, vertically, and horizontally with respect to each other.

The second end of the first coupler forms a coupling mechanism which has an interior side and an exterior side. Similarly, the second end of the second coupler forms a coupling mechanism which has an interior side and an exterior side. The interior side of the couplers have one or more recesses called locator pockets. In some embodiments, the couplers may be similarly shaped and sized such that when the interior side of the first coupler is positioned over the interior side of the second coupler, the locator pockets on the first coupler line up with the locator pockets on the second coupler.

Each coupler also has fastener penetrations which pass through the coupling mechanism of the couplers. The fastener penetrations pass through the coupling mechanism between the interior side and the exterior side. When the locator pockets of the first and second coupler are aligned, the fastener penetrations of the first and second coupler are also aligned.

As the first and second couplers are brought into an aligned position, a locator may be placed into the void created by each aligned locator pocket pair. In other embodiments, the locators may be magnetic allowing them to be more easily retained within the locator pocket of a metallic coupler during assembly.

After the locators are inserted into the locator void or voids formed by each pair of locator pockets and the couplers are brought into approximate alignment, the user may insert male hardware, such as bolts, through the hardware penetration from the exterior side of one of the couplers. The inserted male hardware may be captured by applying female hardware, such as nuts, to the male hardware from the exterior side of the opposite coupler.

As the user tightens the nuts onto the bolts the interior sides of the two couplers will be pulled towards each other. As the interior sides are pulled towards each other the locator pockets begin to apply a compressive force to the locators. This compressive force seats the locators into their respective locator pockets, causing the couplers to self-align, often colinearly, with each other. When the hardware has been firmly tightened, the locators will have accurately and precisely aligned the couplers with each other and helped to constrain the couplers longitudinally, vertically, and horizontally with each other.

BRIEF DESCRIPTION OF THE DRAWINGS

Other features, combinations, and embodiments will be appreciated by one having the ordinary level of skill in the art of coupling assemblies and accessories upon a thorough review of the following details and descriptions, particularly when reviewed in conjunction with the drawings, wherein.

DETAILED DESCRIPTION

Figure 1:
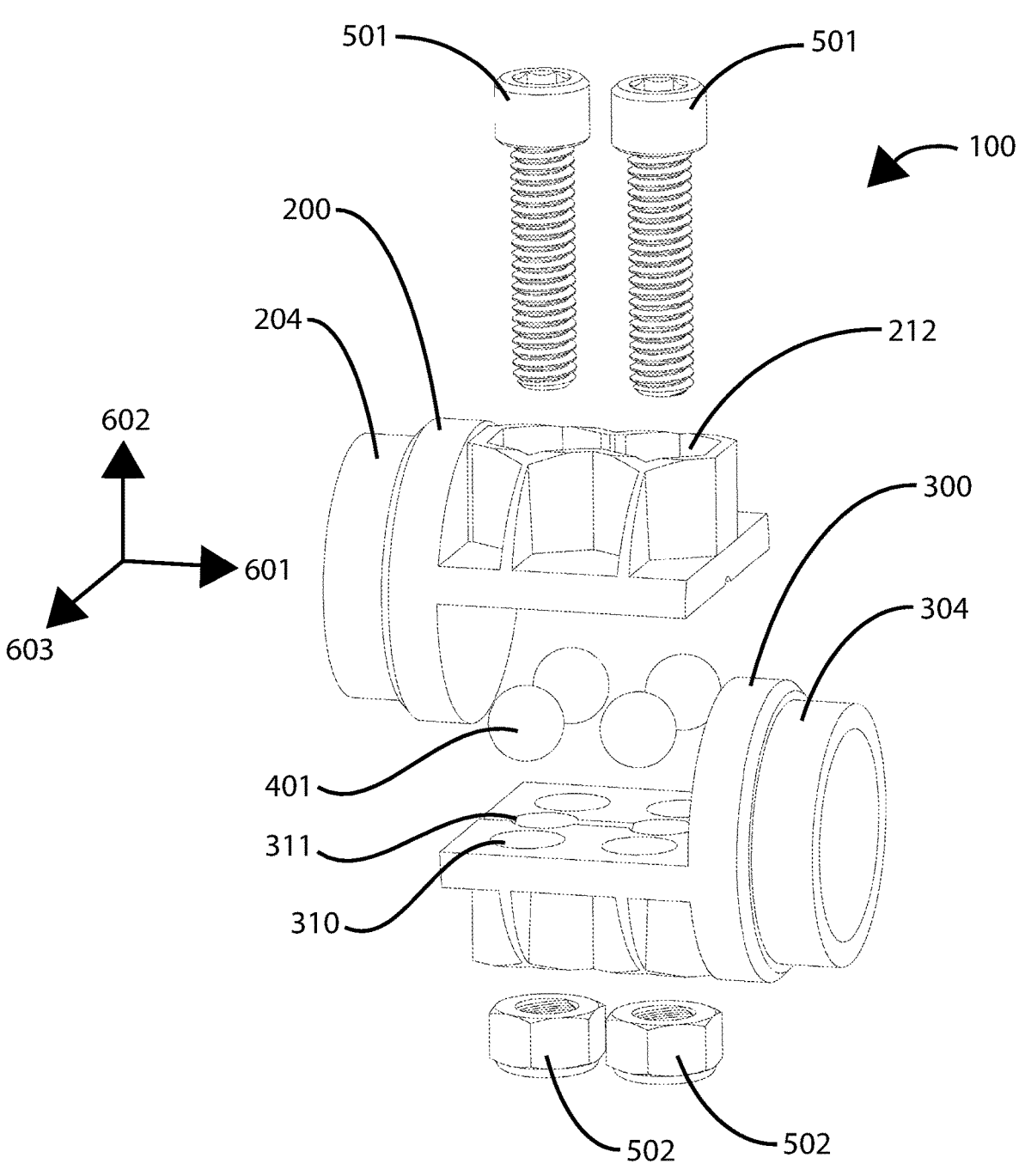
FIG. 1 shows an isometric view of the coupling assembly in accordance with a first illustrated embodiment.
Figure 2:
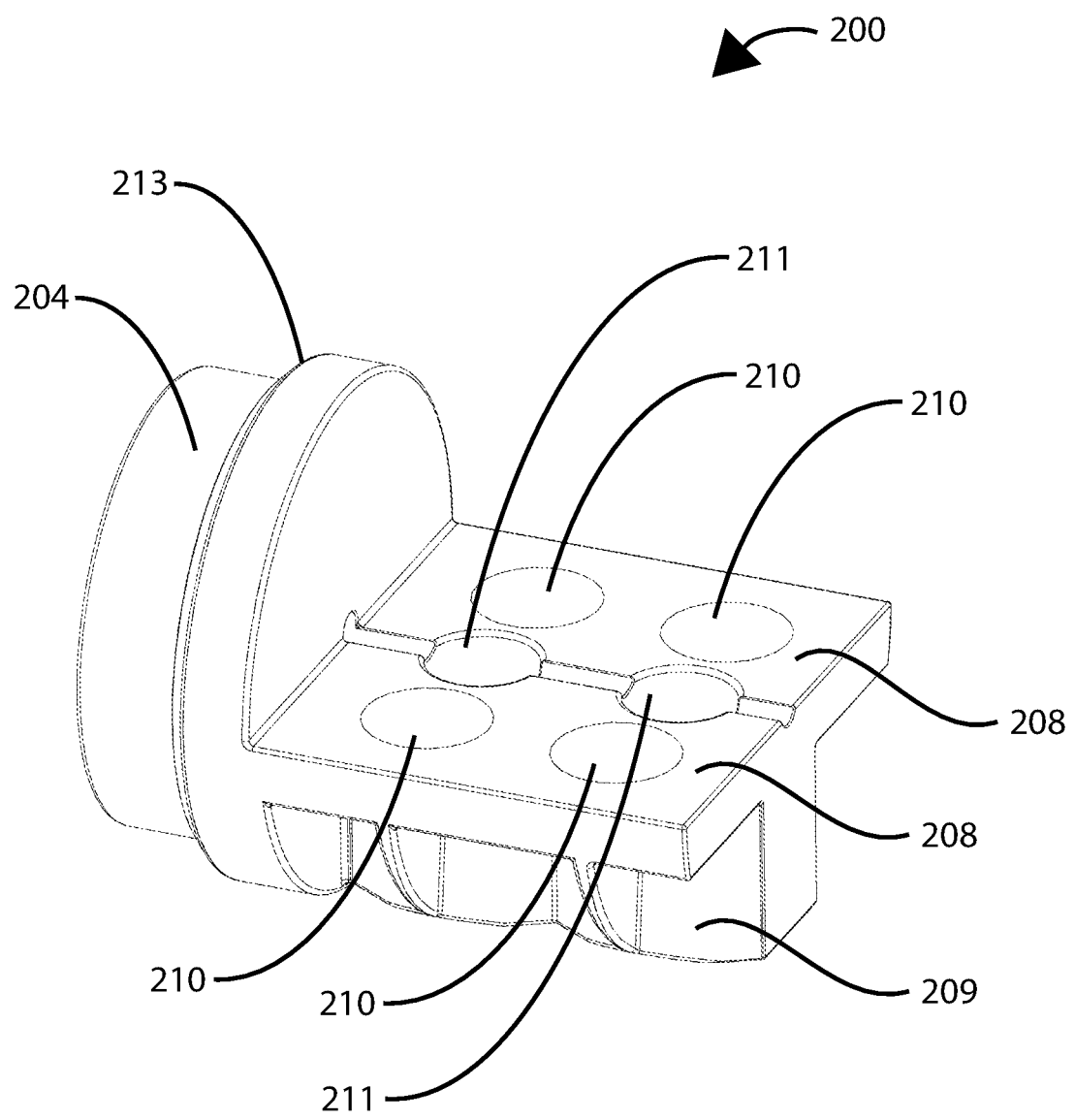
FIG. 2 shows an isometric view of the first coupler in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

Unless explicitly defined herein, terms are to be construed in accordance with the plain and ordinary meaning as would be appreciated by one having skill in the art.

General Description of Embodiments

A coupling assembly is disclosed. The coupling assembly comprises at least two couplers, a plurality of locators, and a means of holding the two couplers together. In preferred embodiments, a plurality of hardware are utilized to hold the two couplers together.

In some embodiments, a coupler may be defined by a first end, a second end, and a central axis which passes between the first end and the second end. In some embodiments, the first end may be configured with a mating feature which provides a means for attaching the first coupler to an assembly member. In some embodiments, the second end may be configured with a coupling mechanism which provides a means for attaching the coupler to one or more other couplers.

In some embodiments, the first and second couplers are the same shape and size. Furthermore in some embodiments, the couplers may be the exact replicas of each other. This is to say that a manufacturer may produce two identical couplers which may be coupled to each other. In some embodiments, more than two identical couplers may be coupled to each other. However, it is not necessary that couplers involved in a given coupling assembly be the same shape and size in all embodiments of the invention.

In some embodiments, the first end mating feature is configured to mate with a tubular assembly member. If the tubular assembly member is cylindrical, the mating feature may form a cylindrical shape which can be inserted into the tubular assembly member. In some embodiments, the tubular assembly member may be welded to the mating feature. In such embodiments, the mating feature may be designed to be sufficiently thick such that the heat applied during welding does not melt through to the interior of the mating feature.

In some embodiments, the second end of a coupler may be configured with a coupling mechanism. The coupling mechanism may have an interior side which is shaped to be coupled to the interior side of another coupling mechanism. The coupling mechanism may also have an exterior side which is opposite the interior side. The interior side of a single coupler may be comprised of one or more surfaces which may or may not be parallel and/or coplanar to each other. In some embodiments, this surface or surfaces may be tilted at an angle with respect to the central axis of the coupler. In addition, these surfaces may be at various distances away from the central axis of the coupler. In some preferred embodiments, the interior side surface is aligned with a single plane, the plane being oriented perpendicular to a radius emanating from the central axis of the coupler.

In some embodiments, the coupling assembly utilizes hardware to hold the couplers together. In preferred embodiments, the hardware used are conventional threaded bolts and nuts. The couplers may have hardware penetrations which pass between the exterior side and interior side of the coupling mechanism. These hardware penetrations may be perpendicular to the interior side surface of the couplers. In some embodiments, the coupling assembly may be held together by other means. For example and without limitation, in some embodiments of the coupling assembly the couplers may be held together with latches, cam devices, or straps. In other embodiments, the hardware penetration itself may be configured with receiving threads such that the inserted male hardware may be threaded into the threaded hardware penetration.

In some embodiments, the exterior side of the coupling mechanism may be configured with one or more nut retainment features which prevent the nut from freely spinning. The nut retainment features may enable the user to tighten the bolts by simply inserting the nut into the nut retainment feature and rotating the bolt on to the retained nut. In some embodiments, the nut retainment features may be hexagonally shaped sockets. The sockets may be cavities formed by material that was removed from the exterior side of the coupler. The sockets may be formed by protrusions which rise away from the exterior surface of the coupler.

The interior side surface or surfaces of the coupling mechanism may be configured with locator pockets. The locator pockets are recesses or cavities disposed on the surface of the interior side of a coupler. When the interior side of two or more coupling mechanisms belonging to two or more couplers are positioned over each other, interior side to interior side, the locator pockets of one coupler align with the locator pockets of the other coupler or couplers. The volume formed by two aligned locator pockets is referred to as a locator void.

The locator pockets may be precisely shaped to receive a given size and shape locator. In some embodiments, the locator pockets are generally conical and the associated locators are generally biconically shaped. For the purposes of this invention, biconically shaped locators may be considered the shape produced when the base of one cone is attached to the base of a second cone. The tips of the bicone need not come to a fine point the way a conventional cone is pointed.

In some embodiments, the locator pockets may be generally cylindrical, and the associated locators are generally cylindrically shaped. In preferred embodiments, the locator pockets may be generally hemispherical and the associated locators are spherically shaped. In some embodiments, the locator pockets may be partially hemispherically shaped. For the purposes of this invention, the term partially hemispherically shaped is defined as a shape which follows the rounded surface of a hemisphere but the rounded surface does not fully extend up to what would be considered the equator of the hemisphere. A partial hemisphere does not have the full depth of a true hemisphere.

In preferred embodiments, the locator pocket is sized to be no larger than half the size of the associated locator. In preferred embodiments, the depth of the locator pocket is less than half the vertical length of the locator. For example and without limitation, in the embodiments in which the locator is a sphere, the locator pocket may be no deeper than half of the diameter of the sphere. This slight undersizing of the locator pocket causes the diameter of a spherical locator placed in the locator pocket to sit slightly above the surface of the interior side of the coupling mechanism.

In other embodiments, the total length of the locator in the vertical dimension may be no shorter than the depth of the void created by two locator pockets. The undersizing of the void may ensure that the compressive force applied by the hardware is largely or wholly transferred through locators and not from one coupler interior surface to another coupler interior surface directly.

If desired, the user may apply a small amount of grease to the locators or to the locator pockets before inserting the locators into the locator pockets. The grease is not necessary to the proper use of the coupling assembly, and the grease is not necessary to the proper alignment or strength functionalities of the coupling assembly. The grease may simply serve to adhere the locators to the locator pockets, keeping them in place while the user positions the couplers into the appropriate approximate alignment prior to engaging the couplers together.

When engaging the coupling the user places locators into the locator pockets of one or more couplers. In preferred embodiments, only one locator is applied to every aligned pair of locator pockets. The user may then bring the interior sides of two or more couplers into approximate alignment each other. The couplers will be considered approximately aligned when the locator pockets are approximately centered over one another. When the couplers are approximately aligned the hardware penetrations, if present, of one coupler may be aligned with the hardware penetrations of another coupler. The user may then keep the couplers in the approximately aligned position while they apply the hardware to the coupling assembly.

In some embodiments, the hardware bolt may be inserted from the exterior side of the first coupler, through the interior side of a first coupler, through the interior side of a second coupler, before passing through the exterior side of a second coupler such that a female fastener may be threaded onto the male fastener. The user may apply a nut to the bolt from the exterior side of the second coupler. In some embodiments, the bolts may be inserted through the coupling assembly in either direction through the hardware penetrations.

As the user tightens the hardware of a coupling assembly, the coupling mechanism of one coupler is pulled toward the coupling mechanism of the other coupler. This action applies a compressive force to the locators which are disposed within the locator voids formed by each pair of aligned locator pockets. This compressive force may seat the locator within the locator pocket. In preferred embodiments, as the couplers are coupled together and secured by tightening the hardware the couplers are brought into colinear alignment.

As each locator seats within its pair of locator pockets the couplers are brought into accurate and precise longitudinal, vertical, and horizontal alignment. These locators may also provide strength to the coupling assembly when subjected to forces. If a component of force is applied to the couplers along the plane of its interior side surface, the locators may be put into shear stress. If a component of force is applied to the couplers along the longitudinal axis of the couplers, the locators may be put into shear stress. If a component of force is applied to the couplers in a direction which is perpendicular to the to the interior side surface plane, the locators may be placed in compressive stress.

Manufacturing

The spherical locators may be obtained commercially, for example and without limitation the spherical locators may be selected from commercially available ball bearings. Alternatively, the locators can be customized in accordance with the level and knowledge of one having skill in the art Generally, the couplers, locators, and hardware are made of metallic materials or metallic alloys. Otherwise, the couplers, locators, and hardware can be fabricated in accordance with the level and knowledge of one having skill in the art.

Each of the components of the coupling assembly and related system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

First Illustrated Embodiment

The first illustrated embodiment of the coupling assembly (100) is depicted in FIG. 1 through FIG. 10. The frame of reference for the coupling assembly, and specifically the coupling mechanism of the coupling assembly, is shown in FIG. 1 which identifies the longitudinal direction (601), the vertical direction (602), and the horizontal direction (603). FIG. 1 depicts an exploded view of a first coupler (200), and a second coupler (300) with the interior side (208) of the first coupler facing the interior side (308) of the second coupler. A mating feature (204) and mating shoulder (213) are disposed on the first end (201) of the first coupler. A mating feature (304) and mating shoulder (313) are disposed on the first end (301) of the second coupler. A coupling mechanism (207) is disposed on the second end (202) of the first coupler. A coupling mechanism (307) is disposed on the second end (302) of the second coupler. Four locator pockets (210) are shown on the interior side of the first coupler in FIG. 2. Similarly, four locator pockets (310) are shown on the interior side of the second coupler in FIG. 4.

FIG. 1 shows the location of two threaded male fasteners (501) which may be inserted through the coupling assembly and threaded into two female fasteners (502). The female fasteners are applied from the opposite side of the coupling assembly (100) from the male fasteners. In FIG. 1 four locators (401) are positioned such that they will be captured between the first coupler locator pockets (210) and the second coupler locator pockets as the couplers are coupled with each other.

Figure 3:
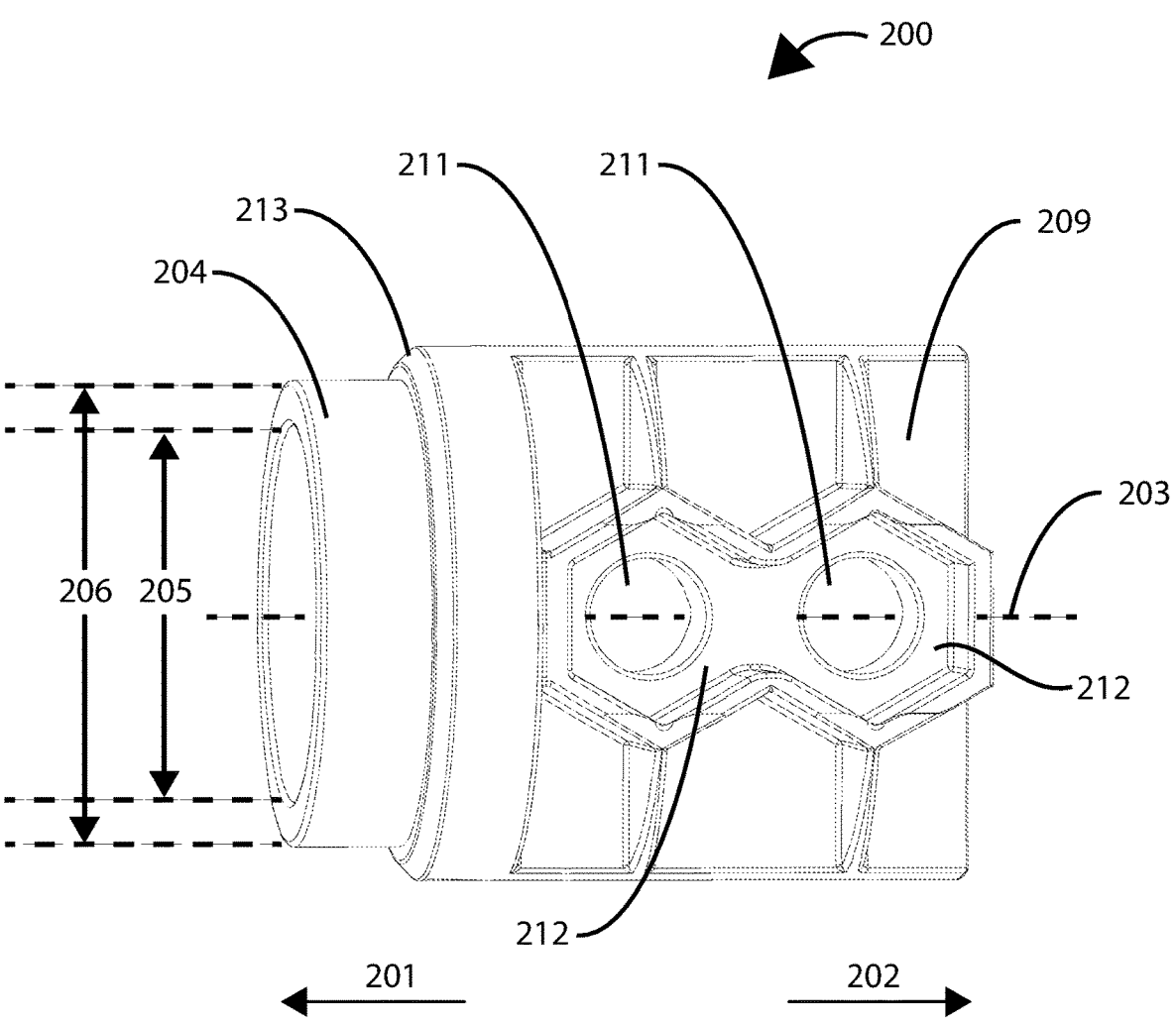
FIG. 3 shows a top view of the first coupler in accordance with a first illustrated embodiment.
Figure 4:
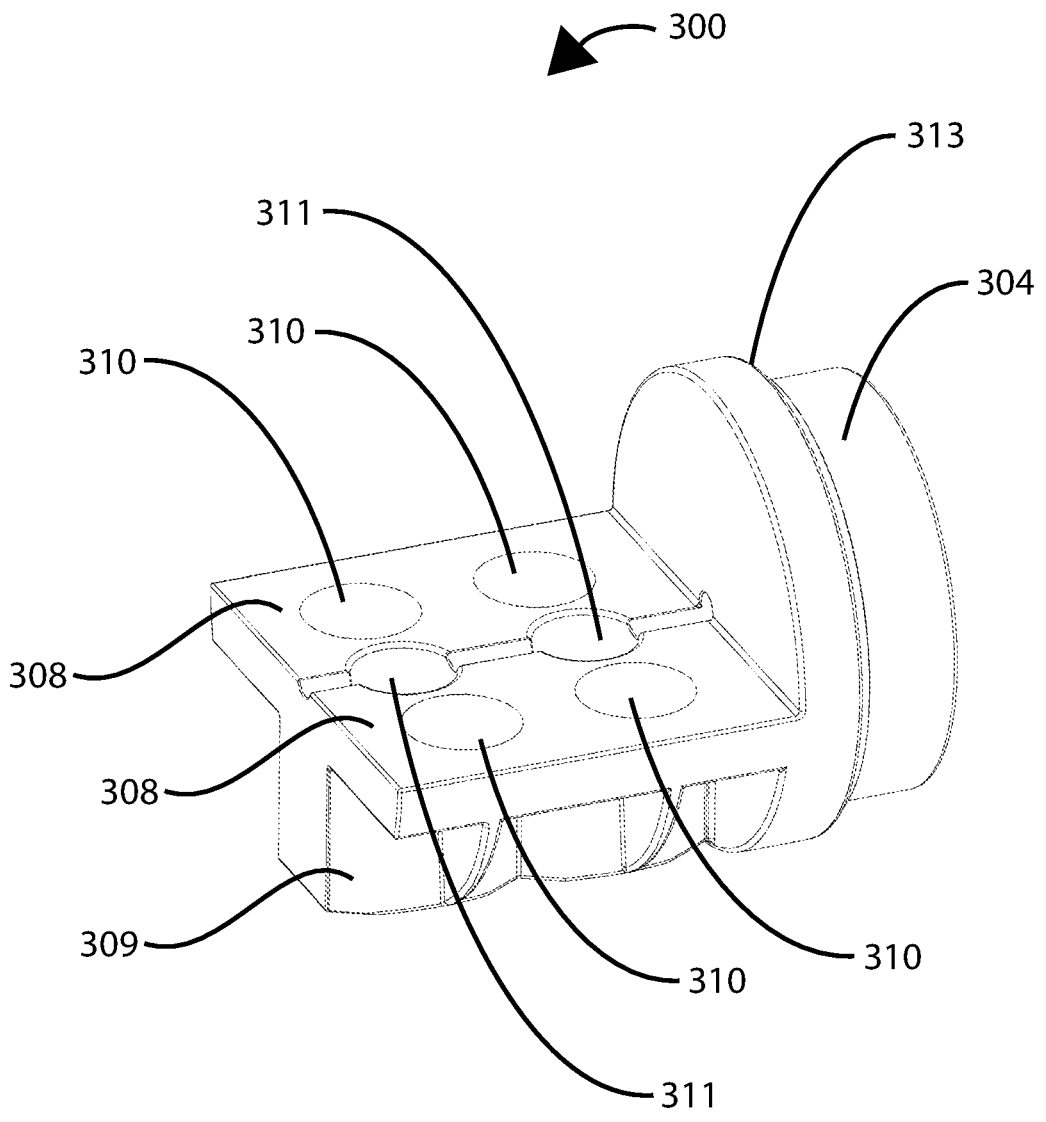
FIG. 4 shows an isometric view of the second coupler in accordance with a first illustrated embodiment.
Figure 5:
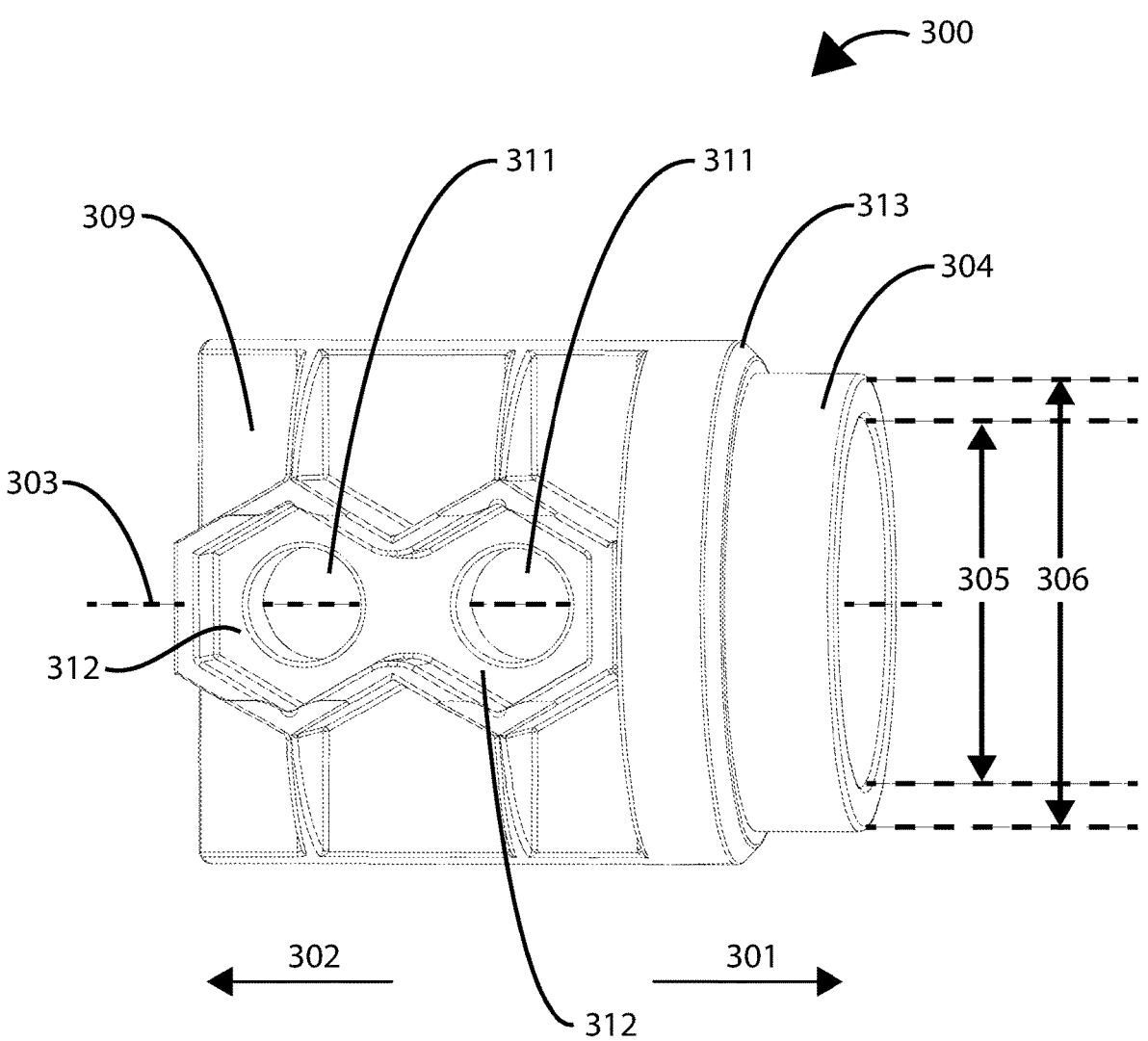
FIG. 5 shows a bottom view of the second coupler in accordance with a first illustrated embodiment.
Figure 6:
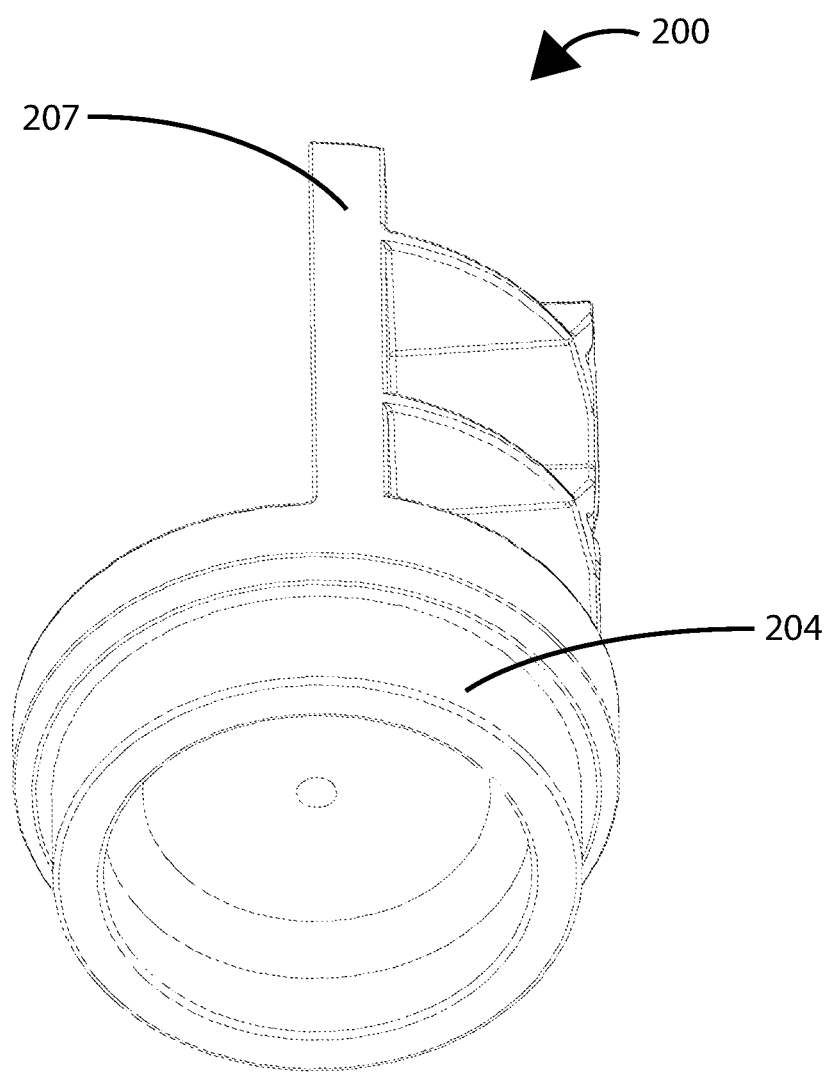
FIG. 6 shows a side view of the first coupler from its first end.
Figure 7:
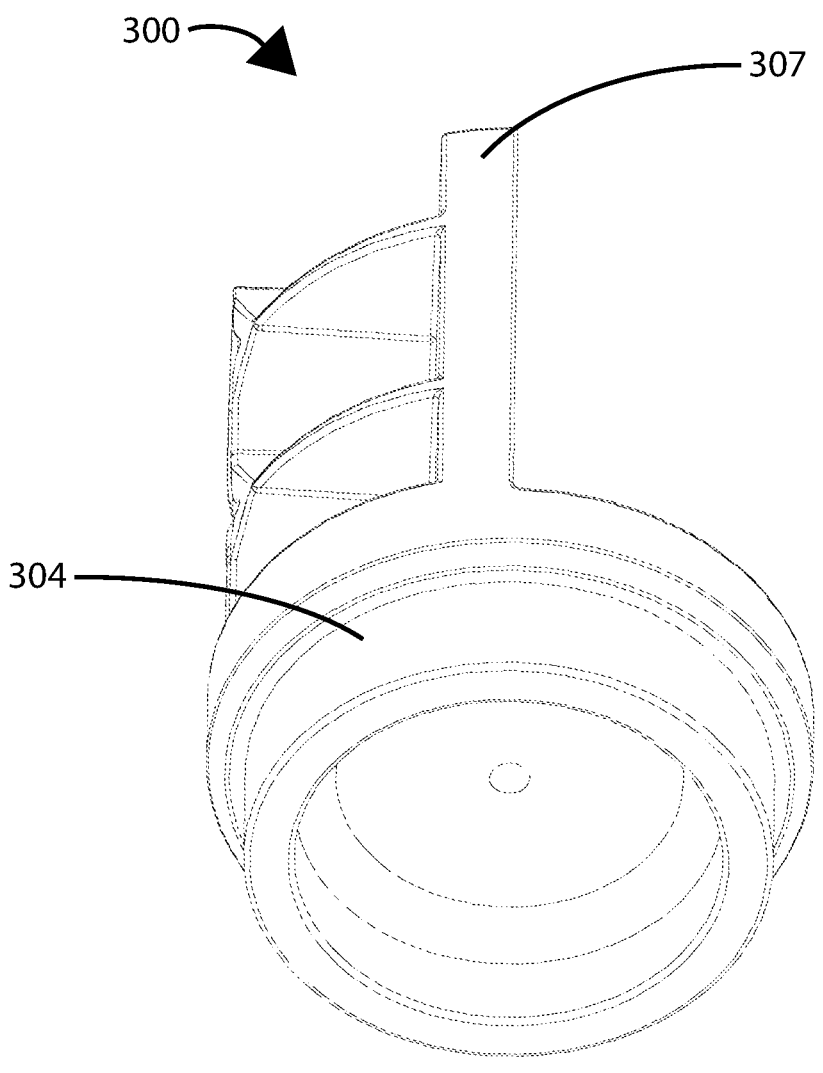
FIG. 7 shows a side view of the second coupler from its first end.

In FIG. 3 the central axis (203) of the first coupler (200) is shown. In FIG. 3 the inner diameter (205) and outer diameter (206) of the of the mating feature (204) on the first coupler are shown. FIG. 3 also shows the fastener penetrations (211) and a nut retainment feature (212) which are disposed on the exterior side (209) of the first coupler. In FIG. 5 the central axis (303) of the second coupler is shown. In FIG. 5 the inner diameter (305) and outer diameter (306) of the of the mating feature (304) on the second coupler are shown. FIG. 5 also shows the fastener penetrations (311) and a nut retainment feature (312) which are disposed on the exterior side (309) of the second coupler.

Figures 8, 9, 10:
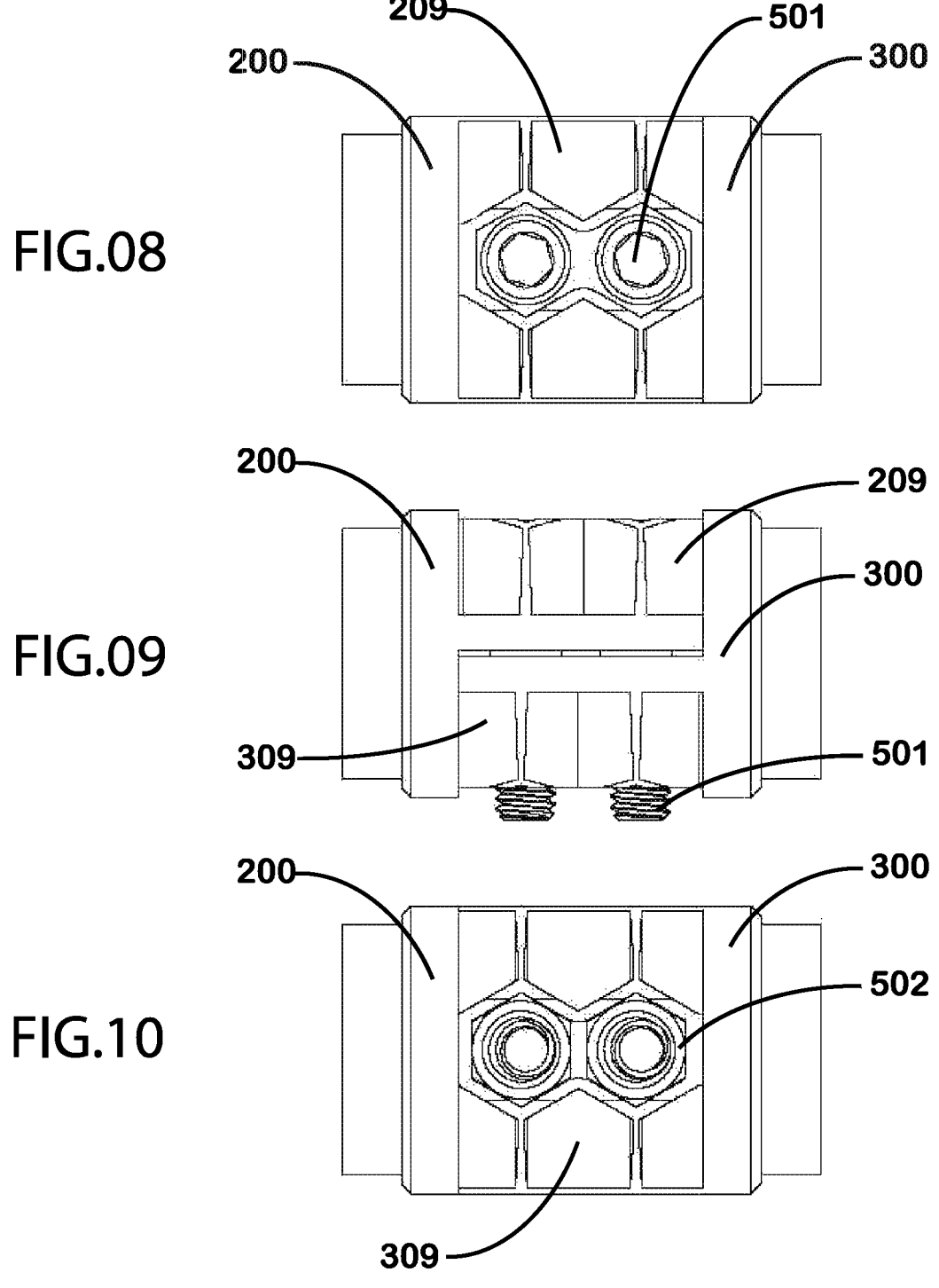
FIG. 8 shows a top view of the assembled coupling assembly.
FIG. 9 shows a side view of the assembled coupling assembly.
FIG. 10 shows a bottom view of the assembled coupling assembly.

FIG. 8 through FIG. 10 shows the assembled colinear coupling assembly (100).

Feature List

| | |
|---|---|
| Coupling Assembly | (100) |
| First Coupler | (200) |
| First Coupler First End | (201) |
| First Coupler Second End | (202) |
| First Coupler Central Axis | (203) |
| First Coupler Mating Feature | (204) |
| First Coupler Mating Feature Inner Diameter | (205) |
| First Coupler Mating Feature Outer Diameter | (206) |
| First Coupler Coupling Mechanism | (207) |
| First Coupler Interior Side | (208) |
| First Coupler Exterior Side | (209) |
| First Coupler Locator Pockets | (210) |
| First Coupler Fastener Penetrations | (211) |
| First Coupler Nut Retainment Feature | (212) |
| First Coupler Mating Shoulder | (213) |
| Second Coupler | (300) |
| Second Coupler First End | (301) |
| Second Coupler Second End | (302) |
| Second Coupler Central Axis | (303) |
| Second Coupler Mating Feature | (304) |
| Second Coupler Mating Feature Inner Diameter | (305) |
| Second Coupler Mating Feature Outer Diameter | (306) |
| Second Coupler Coupling Mechanism | (307) |
| Second Coupler Interior Side | (308) |
| Second Coupler Exterior Side | (309) |
| Second Coupler Locator Pockets | (310) |
| Second Coupler Fastener Penetrations | (311) |
| Second Coupler Nut Retainment Feature | (312) |
| Second Coupler Mating Shoulder | (313) |
| Locator | (401) |
| Threaded Male Fastener | (501) |
| Threaded Female Fastener | (502) |
| Longitudinal Direction | (601) |
| Vertical Direction | (602) |
| Horizontal Direction | (603) |

What is claimed is:

1. A coupling assembly, comprising:

a. A first coupler, the first coupler being defined by a first end, a second end, and a central axis which passes between the first end and second end, the first end being configured with a mating feature providing a means for attaching the first coupler to an assembly member, the second end being configured with a coupling mechanism, the coupling mechanism having an interior side being generally interiorly facing, and an exterior side being generally facing away from the central axis, the interior side being comprised of a plurality of surfaces and a plurality of locator pockets, the locator pockets being precisely shaped cavities disposed on the interior side in precise locations, the coupling mechanism having a plurality of fastener penetrations between the interior side and the exterior side;

b. A second coupler, the second coupler being defined by a first end, a second end, and a central axis which passes between the first end and second end, the first end being configured with a mating feature providing a means for attaching the second coupler to an assembly member, the second end being configured with a coupling mechanism, the coupling mechanism having an interior side being generally interiorly facing, and an exterior side being generally facing away from the central axis, the interior side being comprised of a plurality of surfaces having a plurality of locator pockets, the locator pockets being precisely shaped cavities disposed on the interior side in precise locations, the coupling mechanism having a plurality of fastener penetrations between the interior side and the exterior side;

c. A plurality of locators, the locaters being configured within each locator void created by each pair of locator pockets when the coupling assembly is assembled, the locators being precisely sized and shaped such that when first coupler and second coupler are tightened towards each other, the locator pockets capture the locators, the plurality of locator pockets on the first coupler having a depth that is less than half the vertical length of a locator, the plurality of locator pockets on the second coupler having a depth that is less than half the vertical length of a locator, the void created by pairs of aligned locator pockets being slightly undersized compared to an inserted locator such that the locaters receive the compressive force applied by the first coupler and the second coupler; and d. A plurality of fasteners, the fasteners comprising a plurality of threaded male fasteners and a plurality of threaded female fasteners, the male fasteners being inserted through the fastener penetrations of the couplers and captured on the opposite side of the coupling assembly by the female fasteners.

2. The coupling assembly of claim 1, wherein:

a. The mating feature of the first coupler and/or second coupler forms a cylindrical shape with an outer diameter such that the cylindrical shape may be inserted into a tubular assembly member.

3. The coupling assembly of claim 1, wherein:

a. The locators are spherically shaped and the locator pockets are partially hemispherically shaped.

4. The coupling assembly of claim 1, wherein:

a. The locators are generally biconically shaped and the locator pockets are generally conically shaped.

5. The coupling assembly of claim 1, wherein:

a. The locators are generally cylindrically shaped and the locator pockets are generally cylindrically shaped.

6. The coupling assembly of claim 1, wherein:

a. The locators are made from a magnetized material.

7. The coupling assembly of claim 1, further comprising:

a. A plurality of other couplers, each of the other couplers being defined by a first end, a second end, and a central axis which passes between the first end and second end, the first end being configured with a mating feature providing a means for attaching the coupler to an assembly member, the second end being configured with a coupling mechanism, the coupling mechanism having an interior side being generally interiorly facing, and an exterior side being generally facing away from the central axis, the interior side being comprised of a plurality of surfaces having a plurality of locator pockets, the locator pockets being precisely shaped cavities disposed on the interior side in precise locations, the coupling mechanism having a plurality of fastener penetrations between the interior side and the exterior side.

8. The coupling assembly of claim 1, further comprising:

a. A plurality of nut retainment features, the nut retainment features being hexagonally shaped socket features located around one or more fastener penetrations on the exterior side of the first coupler or the exterior side of the second coupler, the nut retainment features capable of preventing a female fastener which is inserted into the nut retainment feature from freely spinning.

9. The coupling assembly of claim 1, wherein:

a. The first coupler and second coupler are the same shape and size, making them replicas of each other.

10. A coupling assembly, comprising:

a. A first coupler, the first coupler being defined by a first end, a second end, and a central axis which passes between the first end and second end, the first end being configured with a mating feature providing a means for attaching the first coupler to an assembly member, the second end being configured with a coupling mechanism, the coupling mechanism having an interior side being generally interiorly facing, and an exterior side being generally facing away from the central axis, the interior side being comprised of a plurality of surfaces and a plurality of locator pockets, the locator pockets being partially hemispherically shaped cavities disposed on the interior side in precise locations, the coupling mechanism having a plurality of fastener penetrations between the interior side and the exterior side;

b. A second coupler, the second coupler being defined by a first end, a second end, and a central axis which passes between the first end and second end, the first end being configured with a mating feature providing a means for attaching the second coupler to an assembly member, the second end being configured with a coupling mechanism, the coupling mechanism having an interior side being generally interiorly facing, and an exterior side being generally facing away from the central axis, the interior side being comprised of a plurality of surfaces having a plurality of locator pockets, the locator pockets being partially hemispherically shaped cavities disposed on the interior side in precise locations, the coupling mechanism having a plurality of fastener penetrations between the interior side and the exterior side;

c. A plurality of locators, the locaters being configured within each locator void created by each pair of locator pockets when the coupling assembly is assembled, the locators being precisely sized and spherically shaped such that when first coupler and second coupler are tightened towards each other, the locator pockets capture the locators, each locator pocket having a depth that is less than half the vertical length of a locator and configured to receive no more than half the locator; and d. A plurality of fasteners, the fasteners comprising a plurality of threaded male fasteners and a plurality of threaded female fasteners, the male fasteners being inserted through the fastener penetrations of the couplers and captured on the opposite side of the coupling assembly by the female fasteners.

11. The coupling assembly of claim 10, wherein:

a. The locators are made from a magnetized material.

12. The coupling assembly of claim 10, further comprising:

a. A plurality of nut retainment features, the nut retainment features being hexagonally shaped socket features located around one or more fastener penetrations on the exterior side of the first coupler or the exterior side of the second coupler, the nut retainment features capable of preventing a female fastener which is inserted into the nut retainment feature from freely spinning.

13. The coupling assembly of claim 10, wherein:

a. When the first coupler and second coupler are coupled together by tightening the plurality of fasteners, the locaters receive the compressive force applied by the first coupler and the second coupler.

14. The coupling assembly of claim 10, wherein:

a. The first coupler and second coupler are the same shape and size, making them replicas of each other.

15. A coupling assembly, comprising:

a. A first coupler, the first coupler being defined by a first end, a second end, and a central axis which passes between the first end and second end, the first end being configured with a mating feature providing a means for attaching the first coupler to an assembly member, the second end being configured with a coupling mechanism, the coupling mechanism having an interior side being generally interiorly facing, and an exterior side being generally facing away from the central axis, the interior side being comprised of a plurality of surfaces and a plurality of locator pockets, the locator pockets being precisely shaped cavities disposed on the interior side in precise locations, the coupling mechanism having a plurality of fastener penetrations between the interior side and the exterior side;

b. A second coupler, the second coupler being defined by a first end, a second end, and a central axis which passes between the first end and second end, the first end being configured with a mating feature providing a means for attaching the second coupler to an assembly member, the second end being configured with a coupling mechanism, the coupling mechanism having an interior side being generally interiorly facing, and an exterior side being generally facing away from the central axis, the interior side being comprised of a plurality of surfaces having a plurality of locator pockets, the locator pockets being precisely shaped cavities disposed on the interior side in precise locations, the coupling mechanism having a plurality of fastener penetrations between the interior side and the exterior side, the second coupler further comprising a plurality of nut retainment features, the nut retainment features being hexagonally shaped socket features located around one or more fastener penetrations on the exterior side of the first coupler or the exterior side of the second coupler, the nut retainment features capable of preventing a female fastener which is inserted into the nut retainment feature from freely spinning;

c. A plurality of locators, the locaters being configured within each locator void created by each pair of locator pockets when the coupling assembly is assembled, the locators being precisely sized and shaped such that when first coupler and second coupler are tightened towards each other, the locator pockets capture the locators, the locaters receive the compressive force applied by the first coupler and the second coupler; and d. A plurality of fasteners, the fasteners comprising a plurality of threaded male fasteners and a plurality of threaded female fasteners, the male fasteners being inserted through the fastener penetrations of the couplers and captured on the opposite side of the coupling assembly by the female fasteners e. The plurality of locator pockets on the first coupler have a depth that is less than half the vertical length of a locator, the plurality of locator pockets on the second coupler having a depth that is less than half the vertical length of a locator, the void created by pairs of aligned locator pockets being slightly undersized compared to an inserted locator.

16. The coupling assembly of claim 15, wherein:

a. The locators are spherically shaped and the locator pockets are partially hemispherically shaped.

17. The coupling assembly of claim 15, wherein:

a. The first coupler and second coupler are the same shape and size, making them replicas of each other.

* * * * *